3,481,757
DRY PROCESS PORCELAIN ENAMELING FRIT
AND METHOD
Harry J. van Dolah, Wheaton, and Otto C. Linhart, Cicero, Ill., assignors to The Eagle-Picher Company, Cincinnati, Ohio, a corporation of Ohio
No Drawing. Filed July 15, 1964, Ser. No. 382,959
Int. Cl. B44c 1/06; B44d 1/02
U.S. Cl. 117—23                    5 Claims

ABSTRACT OF THE DISCLOSURE

Titania opacified borosilicate frit composition of the pre-nucleated type in which the texture, laydown, and gloss of the enamel coating is improved by the addition to the frit of a small amount of an oxide which may be vanadium oxide, molybdenum oxide, or lead oxide.

---

The present invention relates to an improved titania opacified borosilicate frit composition particularly useful in dry process enameling.

One of the more convenient enameling procedures involves the application of a dry enameling frit onto a hot casting or the like so that the heat of the casting fuses the frit into a uniform film of enamel which readily bonds itself to the underlying surface when the enameled article is cooled. To secure a white color in the enamel, it is common practice to incorporate either an antimony or zirconium opacifier into the composition and to apply sufficient amounts of such opacified frits to produce a coating on the order of 40 to 50 mils in thickness. The use of antimony or zirconium opacifiers, however, in addition to requiring reasonably thick coatings, suffers from the further disadvantage that the resultant enamels are not particularly acid resistant nor is the color as white as would be desired.

There have been some attempts to use titanium dioxide as an opacifier because of its extremely high index of refraction, which results in better hiding power and higher opacity. While titania can be handled reasonably well in a wet process of application, the conventional methods for opacifying frit with titania leave much to be desired when such compositions are used in the dry enameling process. Titania containing enamels frequently produce a mottled appearance which is highly objectionable in the finished article. In addition, the color achieved in the enamel coating is not always the desired blue-white cast but more often is yellowish. In addition, the reflectivity of the enamel surface is not as high as would be desired in high quality enameling.

Substantial improvements in the art of incorporating titania into porcelain enameling frits have recently been made through the use of pre-nucleation of the titania particles in the frit, prior to application to the heated metal surface. The frit is heat treated during its process of manufacture under conditions sufficient to cause at least incipient crystallization of titanium dioxide in the glass, without devitrifying the other glass forming components. The overall process of the improved technique is substantially as follows. The glass composition, containing suitable amounts of titania, is smelted at a temperature on the order of 2500° F. Then, the molten glass is quenched, by quenching rollers or the like, resulting in fritted particles having a temperature below 800° F. The fritted particles are relatively small, being not more than about ¼″ in thickness and usually less than ⅛″, so as to facilitate quickly reheating the particles in the subsequent nucleation step.

The glass particles resulting from the quenching are then heated to a temperature at which nucleation of titanium commences. Nucleation occurs when a number of atoms present in a disordered state aggregate to form centers of crystallization. The size of the nuclei is generally believed to be on the order of 0.005 to 0.010 micron. The temperature of nucleation is usually about 250° F. below the point where crystallization can take place. The minimum temperature for heat treatment is well above the softening point for the glass, and is usually at least 140° F. above the softening point as determined by an interferometer. The maximum temperature is believed to be about 400° F. above the interferometer softening temperature.

The heat treatment time employed in this type of process varies from about 1 minute to 25 minutes, and preferably does not exceed 15 minutes. After the heat treatment has occurred, the particles can be ground to suitable frit size and screened. Generally, the frit size is chosen so that it passes almost entirely through a 10 mesh screen, and about 20% is retained on a 200 mesh screen.

The frit which results consists of particles of a glass matrix containing embedded therein minute titanium dioxide crystals, as the only crystallized material. The remaining glass forming ingredients are in their usual amorphous form. The frit can then be applied directly to heated metal objects maintained at temperatures ranging from about 1400 to 1800° F. and preferably at 1600 to 1700° F. The frit is applied to the hot metal articles through a screen in the usual manner, and fuses to a uniform enamel having substantially improved masking power, a blue-white cast, improved reflectivity, higher gloss, and better texture. Whereas in the case of antimony and zirconium opacified enamels, a thickness of 40 to 50 mils is common, the use of this type of frit secures a better quality porcelain enamel with coatings whose average thickness is only about 25 mils and may range from about 10 to 40 mils.

Apparently, the improved results which have been achieved in the application of titania opacified frits in this manner may be explained along the following lines. In ordinary enameling procedures, where the frit is deposited dry on the heated surface, there occurs a differential thermal analysis whereby the frit undergoes an endothermic change during nucleation and later an exothermic change when crystallization progresses. It is conceivable that the improved process eliminates this endothermic change during the application of the dry powder to the hot surface by the preliminary heat treatment. If a regular titanium frit is heated too rapidly or at too high a temperature for too long a time, the crystals formed are objectionably large. By starting the recrystallization by heating to a point to produce seeding or nucleation, the subsequent crystals occur at a particle size on the order of 0.2 micron. This particle size provides the best opacifying properties and the best color in the enamel coating.

While the foregoing improved process provides substantially improved results in the field of titania opacified enamels, it has now been found that even further improvements can be realized in the technique whereby the texture, laydown, and gloss of the finished product are improved.

An object of the present invention is to provide an improved porcelain enameling frit composition particularly useful in the dry process of application, said improved frit providing better flow characteristics than have heretofore been achieved in enamels of this type.

Another object of the invention is to provide a porcelain enameling frit opacified with titania, and having a higher gloss than the best titania opacified enamels heretofore produced.

Still another object of the invention is to provide a titania opacified frit composition with titania nuclei, and a sufficient amount of other additives which prevent a leathery type of texture from appearing in the final product.

We have now discovered that significant improvements in physical properties of the enamel with regard to its flow characteristics, texture, and gloss can be achieved by combining with the nucleated titania frit, small amounts of one or more of the oxides $V_2O_5$, $MoO_3$, or PbO. Specifically, we have found that amounts up to 2% by weight of one or more of the oxides mentioned will significantly improve the texture, flow characteristics, and gloss of the resulting enamels. Amounts in excess of about 2% of the oxides tend to provide a mottled appearance. Preferably, then, the amount of $V_2O_5$ added is in the range from 0.02 to 2.0%, the amount of $MoO_3$ is in the range from 0.02 to 2.0% and the amount of PbO is in the range from 0.01 to 1.0%.

The basic glass forming ingredients used in accordance with the present invention are given in the following table:

TABLE I

| | Percent by weight |
|---|---|
| $SiO_2$ | 20–50 |
| $B_2O_3$ | 7–25 |
| $P_2O_5$ | 0–5 |
| ZnO | 0–5 |
| $Na_2O$ | 0–25 |
| $K_2O$ | 0–25 |
| $Li_2O$ | 0–5 |
| $F_2$ | 0–20 |
| $TiO_2$ | 8–24 |
| $Al_2O_3$ | 0–4 |
| MgO | 0–3 |

The total amount of alkali oxide ($Na_2O$, $K_2O$, and $Li_2O$) should be in the range from about 10 to 30% by weight. The total amount of acid formers ($B_2O_3$, $P_2O_5$ and $F_2$) should also be in the range from about 10 to 30%. It is important that the amount of acid former be somewhere near the amount of alkali metal oxides present, in order that devitrification of the other glass forming ingredients be prevented, and only the titania appear as minute nuclei. For this purpose, then, it is preferable that the amount of acid formers be approximately the same as the amount of alkali metal oxides present on a molar basis.

The other oxides present, the ZnO, $Al_2O_3$ and MgO should also be controlled, so that the total amount of these three oxides is preferably in the range from about 1 to 3%.

Some amounts of zirconia can be added in substitution of part of the silica, but generally should not exceed about 5%.

There are a number of ways of adding vanadium, molybdenum, and lead compounds into the frits so that they will appear as the desired oxides. For example, the vanadium may be added as ammonium metavanadate, the ammonia volatilizing off under the conditions of melting. The molybdenum can be added as sodium molybdate or ammonium molybdate, while the lead can be added in the form of lead sulfate, lead carbonate, or lead silicate.

The following specific examples illustrates the results obtained more completely.

Examples

The following formula, labelled Formula 1, represented the base composition for some of the examples:

| | |
|---|---|
| $SiO_2$ | 43.20 |
| $B_2O_3$ | 18.04 |
| $P_2O_5$ | 1.15 |
| ZnO | 0.85 |
| $Na_2O$ | 7.76 |
| $K_2O$ | 7.91 |
| $Li_2O$ | 0.84 |
| $F_2$ | 2.57 |
| $TiO_2$ | 18.52 |
| $Al_2O_3$ | 0.23 |
| Total | 101.07 |
| Minus $O_2$ for fluorine | −1.07 |
| | 100.00 |

Numerous variations were made up from this formula. Formula 2 consisted of Formula 1 modified to the extent of decreasing the silica by 0.30 part and adding that amount of $V_2O_5$. Formula 3 consisted of the base composition of Formula 1 except that 0.60 parts of silica were replaced by that amount of $V_2O_5$. Formula 4 replaced 0.30 part of silica with $MoO_3$. Formula 5 was the same as Formula 1 except that 0.15 parts of silica were eliminated in favor of that amount of PbO. Formula 6 replaced 0.60 parts of silica with 0.30 parts of $V_2O_5$ and 0.30 parts $MoO_3$.

All of these frits were made up in the same manner, and applied by conventional dry process enameling techniques to heated cast iron. In all cases, the texture of the enamel was improved, ranging from a slight improvement with Formula Number 5, to marked improvements in Formulas 2, 3, 4 and 6.

Another basic composition was made up with the following analysis:

| | |
|---|---|
| $SiO_2$ | 38.61 |
| $B_2O_3$ | 19.40 |
| $P_2O_5$ | 3.12 |
| $Na_2O$ | 9.75 |
| $K_2O$ | 5.45 |
| $Li_2O$ | 1.72 |
| $F_2$ | 3.11 |
| $TiO_2$ | 17.96 |
| $ZrO_2$ | 2.18 |
| Total | 101.30 |
| Minus $O_2$ for fluorine | −1.30 |
| | 100.00 |

This composition will be referred to as Formula 7. In Formula 8, we substituted 0.15 part of $V_2O_5$ for a corresponding amount of silica. In Formula 9, we raised the $V_2O_5$ of Formula 7 to 0.30 parts. In formula 10, the silica was reduced to 38.16 parts, and the $V_2O_5$ was raised to 0.45 parts. In Formula 11, the additive was 0.35 parts of $MoO_3$. In Formula 12, we employed 0.15 parts of PbO. In Formula 13, all three additives were used, comprising 0.20 parts $V_2O_5$, 0.20 parts $MoO_3$, and 0.10 parts of PbO.

All of these materials were applied to heated cast iron pieces by conventional dry process enameling. In each instance, the addition of the metal oxides in Formulas 8 to 13 inclusive significantly improved the texture of the finished product.

It should be evident that various modifications can be made to the described embodiments without departing from the scope of the present invention.

We claim as our invention:

1. A titania opacified borosilicate frit composition for application to heated metal surfaces by dry process enameling consisting essentially of the following weight percentages:

| | |
|---|---|
| $SiO_2$ | 20–50 |
| $B_2O_3$ | 7–25 |
| $P_2O_5$ | 0–5 |
| ZnO | 0–5 |
| $Na_2O$ | 0–25 |
| $K_2O$ | 0–25 |
| $Li_2O$ | 0–5 |
| $F_2$ | 0–20 |
| $TiO_2$ | 8–24 |
| $Al_2O_3$ | 0–4 |
| MgO | 0–3 | the titania present being in the form of extremely minute nuclei capable of growing into larger titania crystals under the conditions of dry process enameling, the total alkali metal oxide ($Na_2O$, $K_2O$ and $Li_2O$) contents being in the range from 10 to 30% and the total acid former ($B_2O_3$, $P_2O_5$, and $F_2$) contents being in the range from 10 to 30%, the amount of alkali metal oxides and acid formers being substantially the same on a molar basis, said frit also containing an oxide selected from the group consisting of $V_2O_5$, $MoO_3$, and PbO in an amount sufficient to improve the texture of an enamel coating produced from said frit, but not in excess of 2% by weight.

2. The frit of claim 1 containing from 0.02 to 2.0% $V_2O_5$.

3. The frit of claim 1 containing from 0.02 to 2.0% $MoO_3$.

4. The frit of claim 1 containing from 0.01 to 1.0% PbO.

5. The method of porcelain enameling which comprises heating a ferrous surface to a temperature of about 1400 to 1800° F., applying to said surface a frit having the following composition:

| | |
|---|---|
| $SiO_2$ | 20–50 |
| $B_2O_3$ | 7–25 |
| $P_2O_5$ | 0–5 |
| ZnO | 0–5 |
| $Na_2O$ | 0–25 |
| $K_2O$ | 0–25 |
| $Li_2O$ | 0–5 |
| $F_2$ | 0–20 |
| $TiO_2$ | 8–24 |
| $Al_2O_3$ | 0–4 |
| MgO | 0–3 | the titania present being in the form of extremely minute nuclei, the total alkali metal oxide ($Na_2O$, $K_2O$, and $Li_2O$) contents being in the range from 10 to 30% and the total acid former ($B_2O_3$, $P_2O_5$ and $F_2$) contents being in the range from 10 to 30%, the amount of alkali metal oxides and acid formers being substantially the same on a molar basis, said frit also containing an oxide selected from the group consisting of $V_2O_5$, $MoO_3$, and PbO in an amount sufficient to improve the texture of an enamel coating produced from said frit, but not in excess of 2% by weight, fusing said frit on said surface to produce an opaque porcelain enamel coating containing titania crystals of a size substantially larger than in said frit, and having a smoother texture than produced in an enamel coating of the same frit without the addition of said oxide from said group.

References Cited

UNITED STATES PATENTS

| | | | |
|---|---|---|---|
| 2,514,855 | 7/1950 | Goetchius et al. | 106—48 |
| 2,776,899 | 1/1957 | Donahey | 106—45 |
| 2,940,941 | 6/1960 | Dalton | 106—300 XR |
| 3,017,279 | 1/1962 | Van Dolah et al. | 106—48 |
| 3,022,186 | 2/1962 | Hund | 160—300 |
| 3,098,753 | 7/1963 | Van Dolah et al. | 106—48 |
| 3,216,847 | 11/1965 | Armant | 106—48 |
| 3,253,939 | 5/1966 | Durrant et al. | 106—300 |

OTHER REFERENCES

Johnson et al., "Influence of Minor Additions on Color and Electrical Properties of Rutile," J. Amer. Cer. Soc., vol. 32, No. 12, 1949, pp. 398–401.

Yee et al., "The Relation of Viscosity, Nuclei Formation, and Crystal Growth in Titania-Opacified Enamel," J. Amer. Cer. Coc., vol. 39, No. 5, 1956, pp. 188–195.

HELEN M. McCARTHY, Primary Examiner

U.S. Cl. X.R.

106—48, 49, 52, 53, 54, 39; 117—53, 129